US009239741B2

(12) United States Patent
Dai et al.

(10) Patent No.: US 9,239,741 B2
(45) Date of Patent: Jan. 19, 2016

(54) SYSTEM AND METHOD FOR FLEXIBLE DISTRIBUTED MASSIVELY PARALLEL PROCESSING (MPP)

(71) Applicant: FutureWei Technologies, Inc., Plano, TX (US)

(72) Inventors: Yuan Dai, Cupertino, CA (US); Siew Sim-Tang, Saratoga, CA (US); Kamini Jagtiani, Sunnyvale, CA (US); Yang Sun, Palo Alto, CA (US); Gangavara Prasad Varakur, Danville, CA (US); Bai Yang, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 244 days.

(21) Appl. No.: 13/653,308

(22) Filed: Oct. 16, 2012

(65) Prior Publication Data

US 2014/0108633 A1     Apr. 17, 2014

(51) Int. Cl.
*G06F 9/50*     (2006.01)
*G06F 17/30*     (2006.01)

(52) U.S. Cl.
CPC ........ *G06F 9/5061* (2013.01); *G06F 17/30312* (2013.01); *G06F 2209/505* (2013.01)

(58) Field of Classification Search
CPC ............ G06F 17/301; G06F 17/30584; G06F 17/30902; G06F 9/5061
USPC .......... 709/203, 217, 219, 226, 229; 707/718; 718/104; 711/156, 170, 202, 206
See application file for complete search history.

(56) References Cited

U.S. PATENT DOCUMENTS

| 5,675,791 | A | 10/1997 | Bhide et al. |
| 6,421,665 | B1 * | 7/2002 | Brye et al. ............................. 1/1 |
| 7,149,736 | B2 * | 12/2006 | Chkodrov et al. .................... 1/1 |
| 7,941,424 | B2 * | 5/2011 | Xu et al. ........................ 707/714 |
| 8,799,284 | B2 * | 8/2014 | Jagtiani et al. ................ 707/736 |
| 2006/0101224 | A1 | 5/2006 | Shah et al. |
| 2006/0218123 | A1 * | 9/2006 | Chowdhuri et al. .............. 707/2 |
| 2007/0255835 | A1 * | 11/2007 | Coppinger et al. ........... 709/226 |

(Continued)

FOREIGN PATENT DOCUMENTS

| CN | 1399209 A | 2/2003 |
| CN | 101916261 A | 12/2010 |

OTHER PUBLICATIONS

International Search Report received in PCT/CN2013/085297, mailed Jan. 23, 2014, 11 pages.

(Continued)

*Primary Examiner* — Lashonda Jacobs
(74) *Attorney, Agent, or Firm* — Slater & Matsil, L.L.P.

(57) ABSTRACT

An embodiment method for massively parallel processing includes initiating a management instance on an initial machine, the management instance generating an initial partition corresponding to the initial machine, determining a total number of partitions desired for processing a database, the total number of partitions including the initial partition, determining a number of additional machines available to process the database, grouping the initial machine and the additional machines together in a pod, and launching the management instance on the additional machines in the pod to generate the total number of partitions desired for the database. Additional embodiment methods and an embodiment system operable to perform such methods are also disclosed.

21 Claims, 12 Drawing Sheets

(56) References Cited

U.S. PATENT DOCUMENTS

| | | | |
|---|---|---|---|
| 2007/0271211 A1* | 11/2007 | Butcher et al. | 707/1 |
| 2011/0041006 A1 | 2/2011 | Fowler | |
| 2012/0109888 A1* | 5/2012 | Zhang et al. | 707/610 |
| 2012/0117065 A1* | 5/2012 | Nehme et al. | 707/737 |
| 2012/0191699 A1* | 7/2012 | George et al. | 707/718 |
| 2013/0166606 A1* | 6/2013 | Fricke et al. | 707/803 |
| 2014/0101129 A1* | 4/2014 | Branish et al. | 707/714 |
| 2014/0108459 A1* | 4/2014 | Gaza et al. | 707/792 |
| 2014/0188841 A1* | 7/2014 | Sun et al. | 707/718 |

OTHER PUBLICATIONS

Supplementary European Search Report, EP Application No. 13847772.4, Applicant: Huawei Technologies Co., Ltd., dated Nov. 4, 2015, 9 pgs.

\* cited by examiner

50 SAMPLE POD CONFIGURATIONS

| POD NAME |
| --- |
| POD USER(S) AND SECURITY INFORMATION |
| POD NETWORK INFORMATION (e.g., VIRTUAL IP ADDRESS, ETC...) |
| DATABASE MANAGEMENT INSTANCE ACCESS INFORMATION |
| LIST OF PROCESSING MACHINES/NODES |
| LIST OF STORAGE SPACES/VOLUMES AND THEIR SIZE |
| CLUSTER, CONFIGURATION, AND SYSTEM MANAGEMENT AND MONITORING INFORMATION |

FIG. 11

60 SAMPLE DATABASE CATALOG

| DATABASE STRUCTURE AND METADATA |
| --- |
| SCHEMA/DATABASE STRUCTURE AND METADATA |
| TABLE/SCHEMA/DATABASE STRUCTURE AND METADATA |
| DBPartition STRUCTURE AND METADATA |
| NUMBER OF PARTITION (N) |
| ACTIVE PARTITION-TO-PROCESSING-NODE MAP |
| ACTIVE-TO-PASSIVE-PROCESSING-NODE MAP |

FIG. 12

SYSTEM AND METHOD FOR FLEXIBLE DISTRIBUTED MASSIVELY PARALLEL PROCESSING (MPP)

TECHNICAL FIELD

The present disclosure relates to a massively parallel processing (MPP) database management system and, in particular embodiments, to a management system able to detach the number of database partitions from the number of fixed processors.

BACKGROUND

The concept of massively parallel processing (MPP) is the coordinated processing of a program by multiple processors, with each processor working on different parts of the program. The processors communicate with one another to complete a task with each of them using its own operating system and memory resources.

An MPP database system is based on shared-nothing architecture, with the tables of its databases partitioned into segments and distributed to different processing nodes. There is no data sharing among the processing nodes. When database queries arrive, the work of each query is divided and assigned to one of the processing nodes according to a data distribution plan and an optimized execution plan. The processing entities in each processing node manage only their portion of the data. However, these processing entities may communicate with one another to exchange necessary information during their work execution. A query may be divided into multiple sub-queries, and the sub-queries may be executed in parallel or in some optimal order in some or all the processing nodes. The results of the sub-queries may be aggregated and further processed, and subsequently more sub-queries may be executed according to the results.

One of the challenges in an MPP database system has always been in setting up the distributed system, which includes configuring the machines, creating the database, partitioning the tables, and distributing the segments. How data is distributed and how much the distribution is aligned with the business logic greatly determines the overall performance of the system.

A traditional MPP database system allows a database administrator to create a database and distribute its data (i.e., create database partitions) to a fixed number of processors that are setup ahead of time. Unfortunately, the number of partitions a database administrator can create is fixed and directly corresponds to the number of processors available in the traditional MPP database system. In other words, the number of partitions and the number of processors is always the same. If additional partitions are desired, the entire process of setting up instances and partitions must be repeated.

SUMMARY

An embodiment method for massively parallel processing includes initiating a management instance on an initial machine, the management instance generating an initial partition corresponding to the initial machine, determining a total number of partitions desired for processing a database, the total number of partitions including the initial partition, determining a number of additional machines available to process the database, grouping the initial machine and the additional machines together in a pod, and launching the management instance on the additional machines in the pod to generate the total number of partitions desired for the database.

An embodiment method for massively parallel processing including initiating a management instance on an initial machine, the management instance generating an initial partition corresponding to the initial machine, determining a total number of partitions desired for processing a database, the total number of partitions including the initial partition, determining a number of additional machines available to process the database, a sum total of the additional machines and the initial machine less than the total number of partitions desired, grouping the initial machine and the additional machines together in a pod, and launching the management instance on the additional machines in the pod to generate the total number of partitions desired for the database.

An embodiment massively parallel processing system including an initial machine in a pod, the initial machine running a management instance corresponding to an initial partition for processing a database, and an additional machine in the pod, the additional machine running two of the management instances for processing the database, each of the management instances corresponding to an additional partition.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 11 is a table illustrating example pod configurations; and

FIG. 12 is a table illustrating an example database catalog.

Corresponding numerals and symbols in the different figures generally refer to corresponding parts unless otherwise

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

The present disclosure will be described with respect to preferred embodiments in a specific context, namely a massively parallel processing (MPP) database and management thereof. The concepts in the disclosure may also apply, however, to other types of databases and data management systems.

Figure 1:
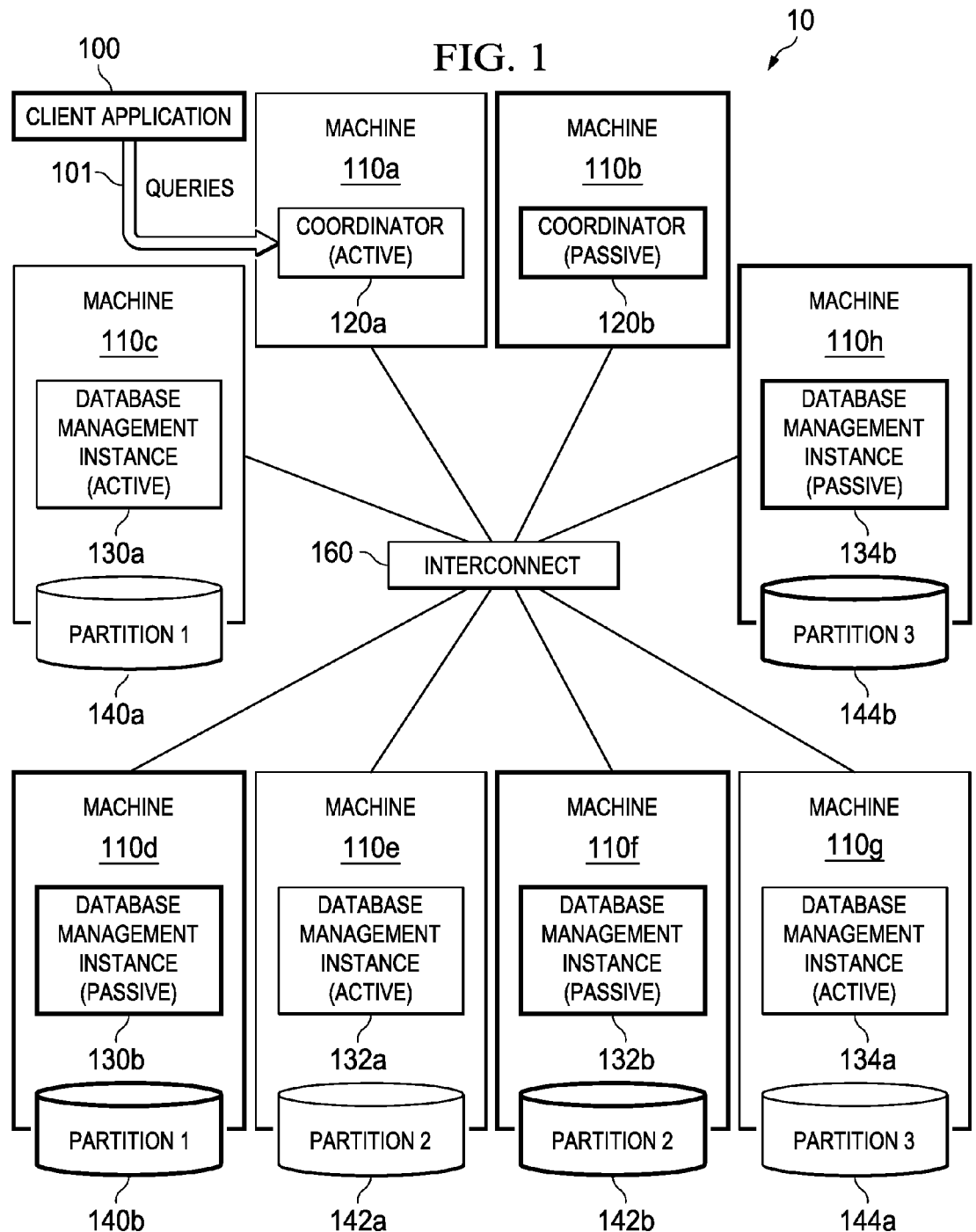
FIG. 1 illustrates a massively parallel processing (MPP) database system configuration for on-line analytical processing (OLAP)

Referring now to FIG. 1, and for the purpose of reference, a conventional or typical massively parallel processing (MPP) database system configuration 10 for on-line analytical processing (OLAP) is illustrated. As shown, a client application 100 presents queries 101 to a machine 110a having an active coordinator 120a. The machine 110a may be operating in conjunction with or alongside another machine 110b having a passive coordinator 110b.

Still referring to FIG. 1, the machines 110a-110b are operably coupled to the interconnect 160. As the name implies, the interconnect 160 permits the machines 110a-110b to communicate with additional machines, namely machines 110c-110h. Notably, machines 110c, 110e, and 110g include an active database management instance 130a, 132a, and 134a, respectively. In contrast, machines 110d, 110f, and 110h include a passive database management instance 130b, 132b, and 134b, respectively. Each of the machines 110c-110h is associated with one of the database partitions, namely partitions 140a-144b as shown in FIG. 1. In the system configuration 10 of FIG. 1, the machine 110a communicating with the client application 100 and the adjacent machine 110b do not have an associated partition.

Figure 2:
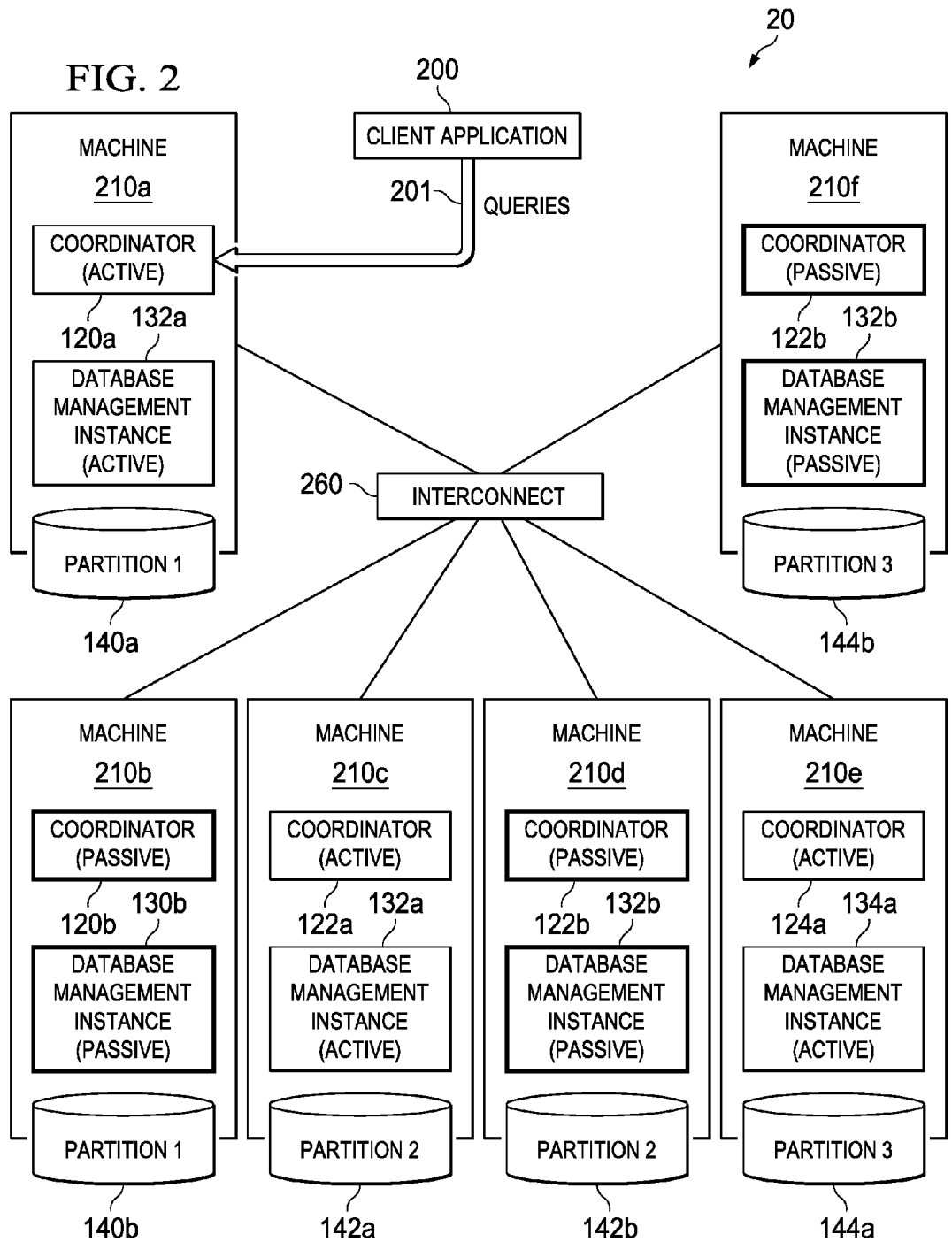
FIG. 2 illustrates an MPP database system configuration for on-line transactional processing (OLTP)

Referring now to FIG. 2, and for the purpose of reference, a conventional or typical MPP database system configuration 20 for on-line transactional processing (OLTP) is illustrated. As shown, a client application 200 presents queries 201 to a machine 210a having an active coordinator 120a and an active database (DB) management instance 130a.

Still referring to FIG. 2, the machine 210a is operably coupled to the interconnect 260. As the name implies, the interconnect 260 permits the machine 210b to communicate with additional machines, namely machines 210b-210f. Notably, machines 210c and 210e include an active coordinator 122a, 124a and an active database management instance 132a, 134a, respectively. In contrast, machines 210b, 210d, and 210f include a passive coordinator 120b, 122b, 124b and a passive database management instance 130b, 132b, 134b, respectively. Each of the machines 210a-210f is associated with one of the database partitions, namely partitions 140a-144b as shown in FIG. 1. In the system configuration 20 of FIG. 2, the machine 210a communicating with the client application 200 has an associated partition 140a.

Figure 3:
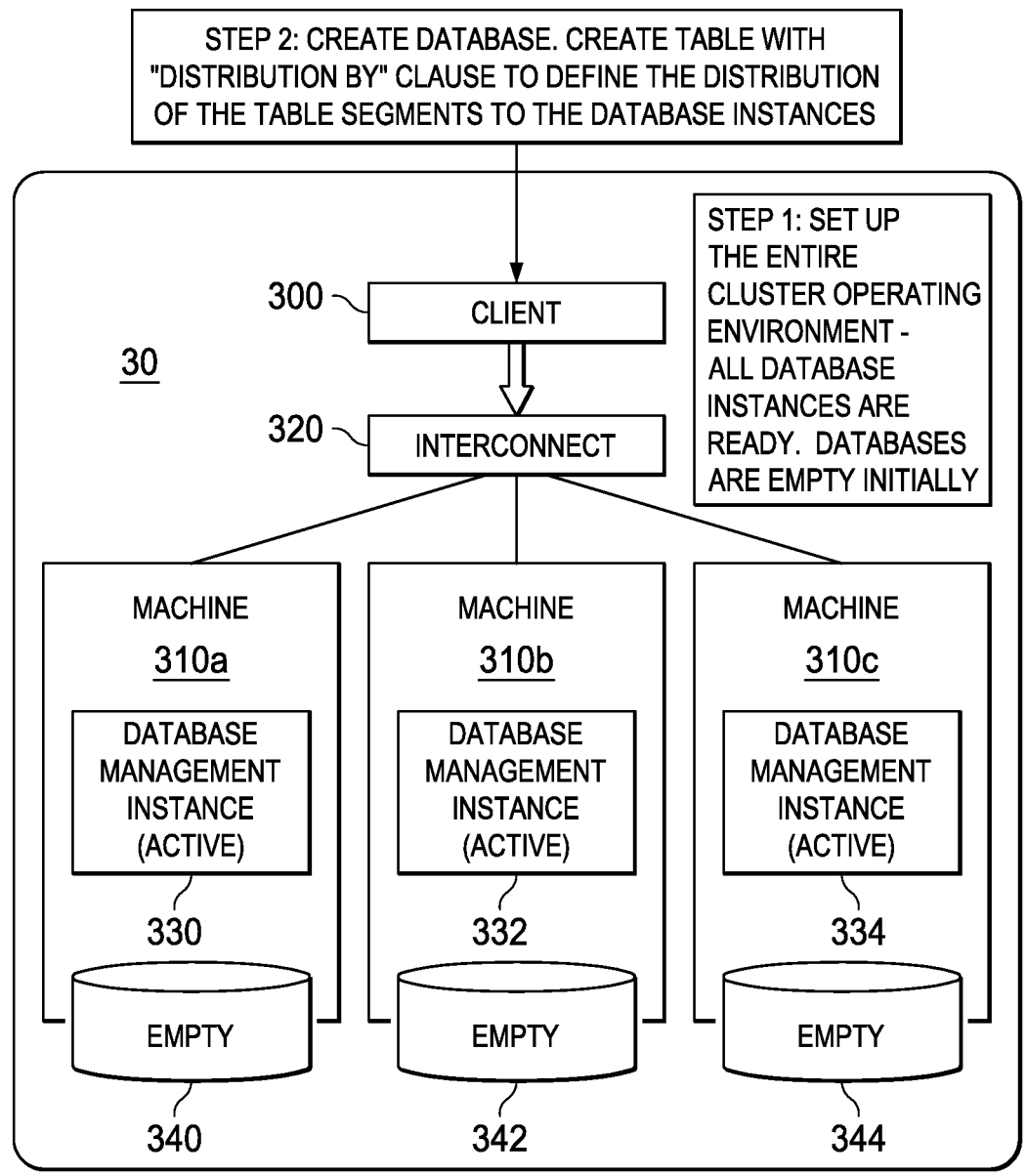
FIG. 3 illustrates a database creation scenario on a traditional MPP database system.

Referring now to FIG. 3, a database creation scenario on a traditional massively parallel processing database system 30 is illustrated. As shown in FIG. 3, a client 300 is operably coupled to the interconnect 320. In turn, the interconnect 320 is operably coupled to machines 310a, 310b, 310c. Each of the machines 310a, 310b, 310c includes an active database management instance 330, 332, 334 associated with an empty partition 340, 342, 344, respectively.

Each of the database management instances 330, 332, 334 and the empty partitions 340, 342, 344 in FIG. 3 are created simultaneously. Moreover, as shown in FIG. 3, only one partition is permitted per available machine. If there is a desire to add a new partition or to remove an existing partition in the traditional massively parallel processing database system 30 of FIG. 3, the entire database creation scenario must be performed all over again. As such, the desire to re-partition a database is cumbersome and time consuming for an information technology (IT) administrator and/or a database administrator (DBA).

Figure 4A:
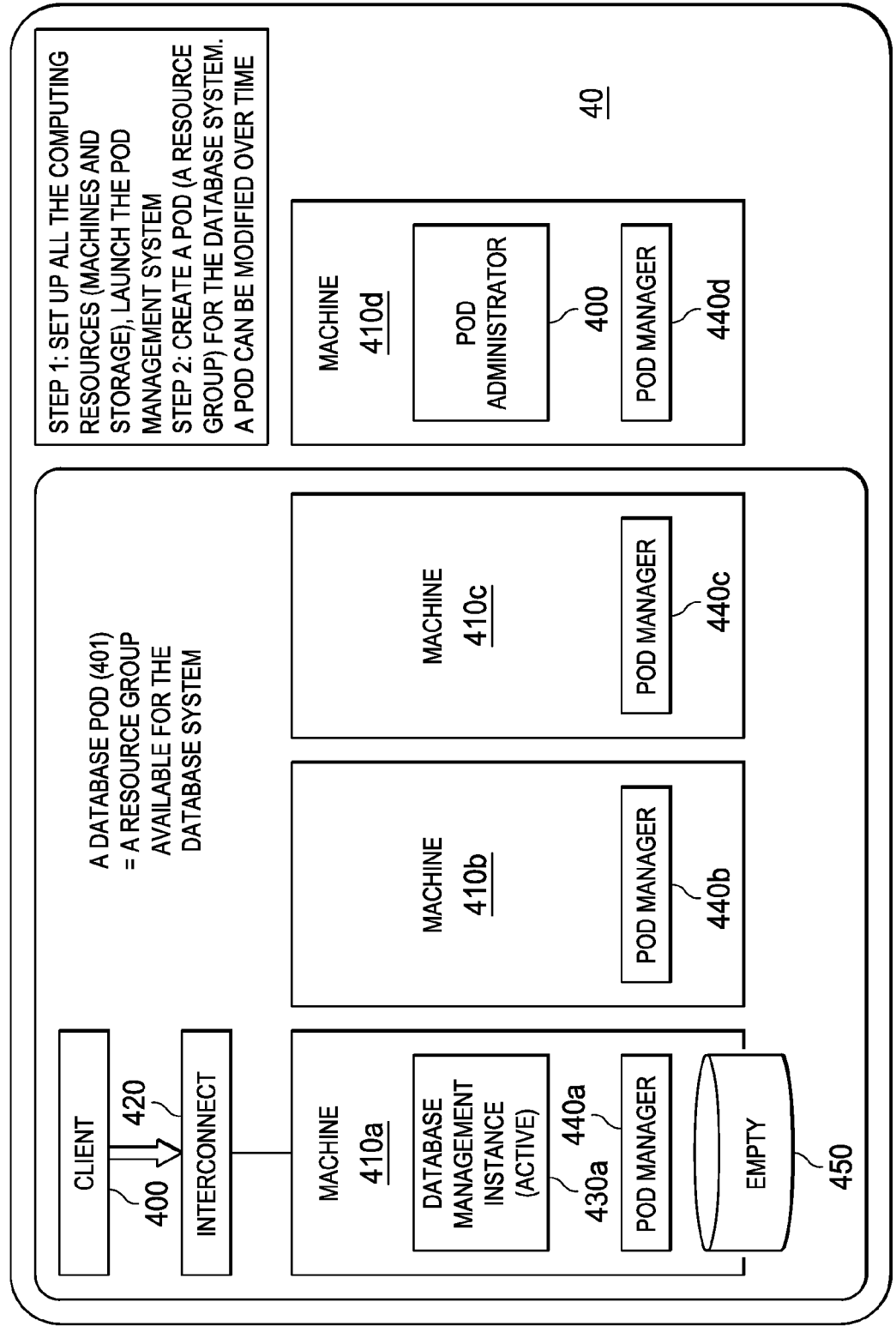
FIG. 4a illustrates an embodiment MPP database system during an initial setup and formation of a pod.

Referring now to FIG. 4a, an embodiment MPP database system 40 during an initial setup and formation of a pod 401 (a.k.a., cluster, resource group, etc.). As shown, a client application 400 presents queries to an interconnect 420. The interconnect 420 passes the queries to a machine 410a. Thereafter, a database management instance 430a is initiated on an initial machine 410a.

In an embodiment, the database management instances disclosed herein are running or executing on a processor associated the machine. As shown, the database management instance 430a generates an initial partition 450 corresponding to the initial machine 410a. Notably, the initial partition 450 is empty of any data or information.

After the database management instance 430a and the initial partition 450 have been created, a total number of partitions desired for processing a database is determined. The total number of partitions includes the initial partition 450. Such determination may be based, at least in part, upon the query or instructions received from the client 400.

Once the total number of partitions has been determined, a number of additional machines 410b, 410c available to process the database is determined. As used herein, the term machine may refer to and/or incorporate a variety of resources including, for example, a processor, memory, storage node, or other infrastructure. Indeed, the term machine is not meant to be limiting. Also, while two of the additional machines 410b, 410c are illustrated in FIG. 4a, it should be appreciated that more of fewer of the additional machines may be available.

After the number of additional machines (i.e., resources) has been determined, the initial machine 410a and the additional machines 410b, 410c are grouped together in the pod 401. Notably, the machine 410d associated with the pod administrator 400 is not considered to be an available resource for processing the database and, as such, not included within the pod 401.

Figure 4B:
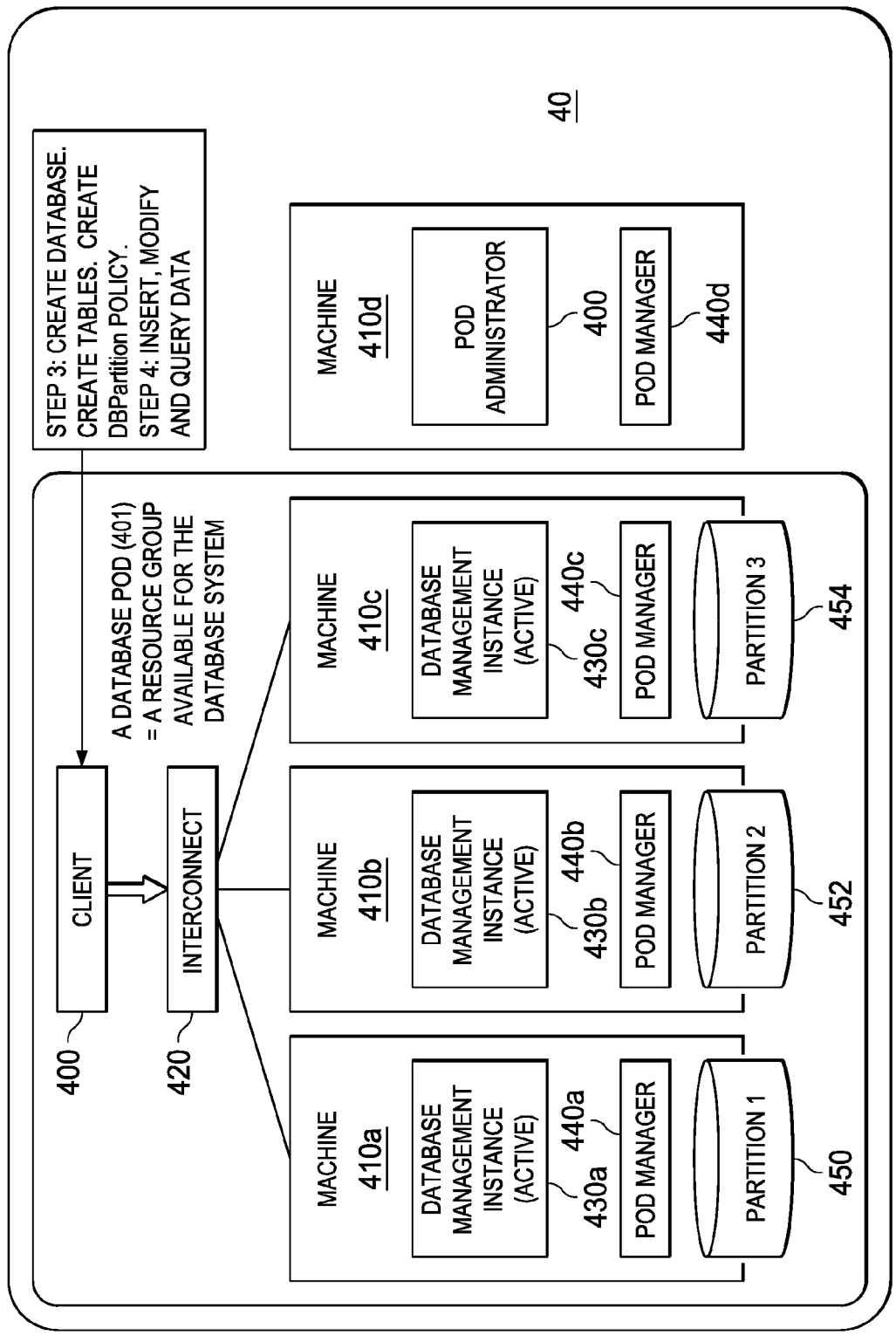
FIG. 4b shows the embodiment MPP database system of FIG. 4a when a database is created and a partitioning policy is defined for the machines in the pod.

Referring collectively to FIGS. 4a-4b, after the pod 401 has been defined the management instance 430a is launched on the additional machines 410b, 410c in the pod 401. As shown in FIG. 4b, this generates the total number of partitions 450, 452, 454 desired for the database. In an embodiment, the machines 410a, 410b, 410c includes a pod manager 440a, 440b, 440c, respectively. The pod managers 440a, 440b, 440c may be used to facilitate communications and cooperation between the machines 410a, 410b, 410c relative to the partitions 450, 452, 454 in the processing of the database.

Referring now to FIG. 5, in an embodiment the client 500 may request, by way of the interconnect 520, for a number of partitions that differs from the number of machines available. In traditional MPP database systems, such a client request would be denied. However, the embodiment management systems disclosed herein are able to accommodate such a request, as more fully explained below.

Figure 5A:
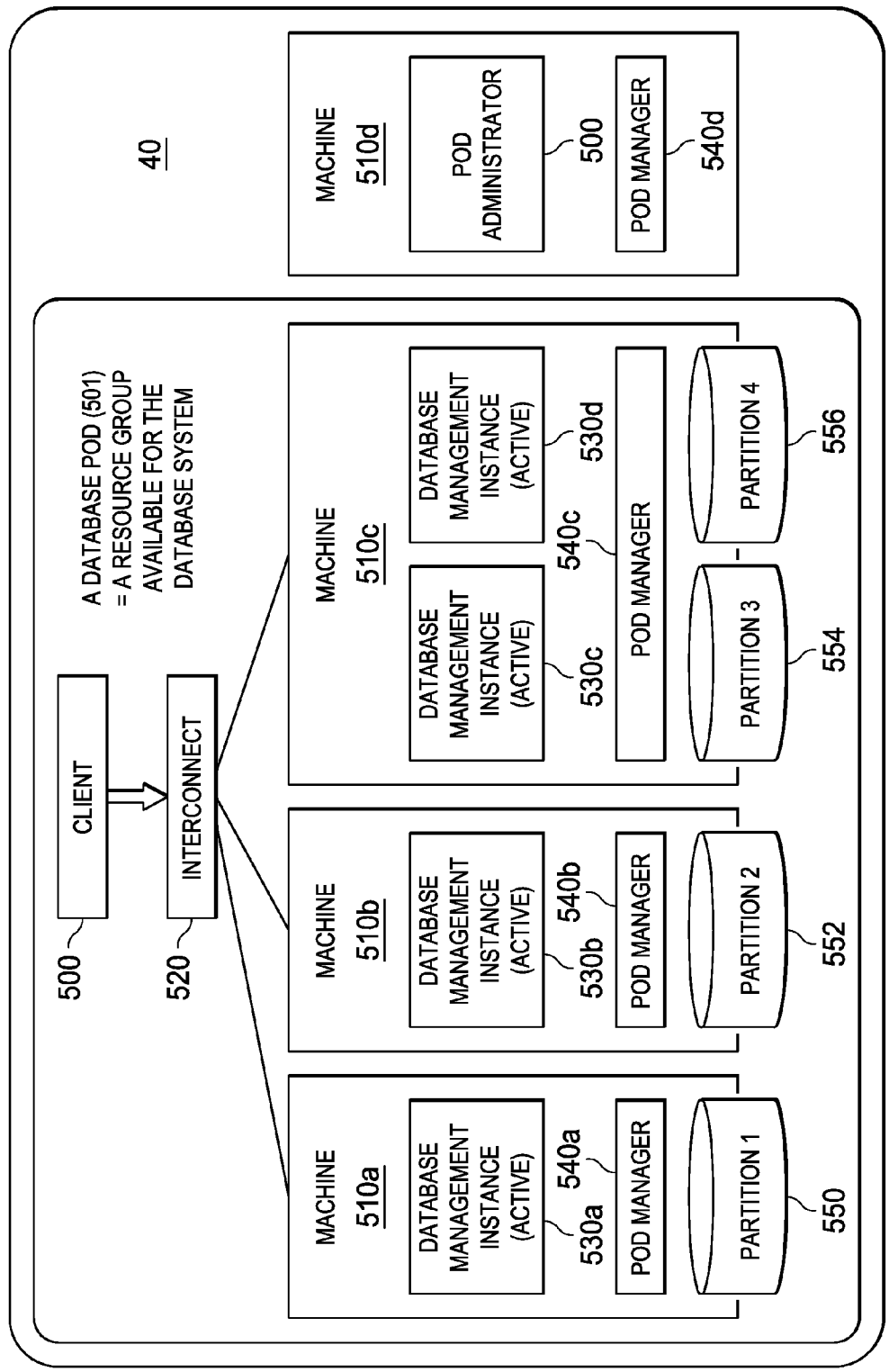
FIG. 5a illustrates an embodiment MPP database system when a number of database partitions is greater than the a number of available machines in the pod.

To handle the request from the client for more or fewer partitions than available resources, the management instance 530a is initiated on the initial machine 510a as shown in FIG. 5a. As shown, the management instance 530a generates an initial partition 550 corresponding to the initial machine 510a. Thereafter, the total number of partitions desired for processing the database is determined based on the client 500 request. Notably, the total number of partitions includes the initial partition 550. In the example depicted in FIG. 5a, the number of partitions (e.g., four) requested by the client exceeds the number of machines available (e.g., three).

Next, a number of additional machines 510b, 510c available to process the database is determined. As shown in FIG. 5a, a sum total of the additional machines 510b, 510c and the initial machine 510a (i.e., three) is less than the total number of partitions 550-556 desired (i.e., four). Thereafter, the initial machine 510a and the additional machines 510b, 510c are grouped together in the pod 501. Then, the management instance 530b, 530c, 540d on the additional machines 510b, 510c in the pod 501 is launched to generate the total number of partitions desired for the database. As shown in FIG. 5a, machine 510c supports two of the management instances 530c, 540d and two of the partitions 554, 556. Notably, the machine 510d associated with the pod administrator 500 is not considered to be an available resource for processing the database and, as such, not included within the pod 501.

Figure 5B:
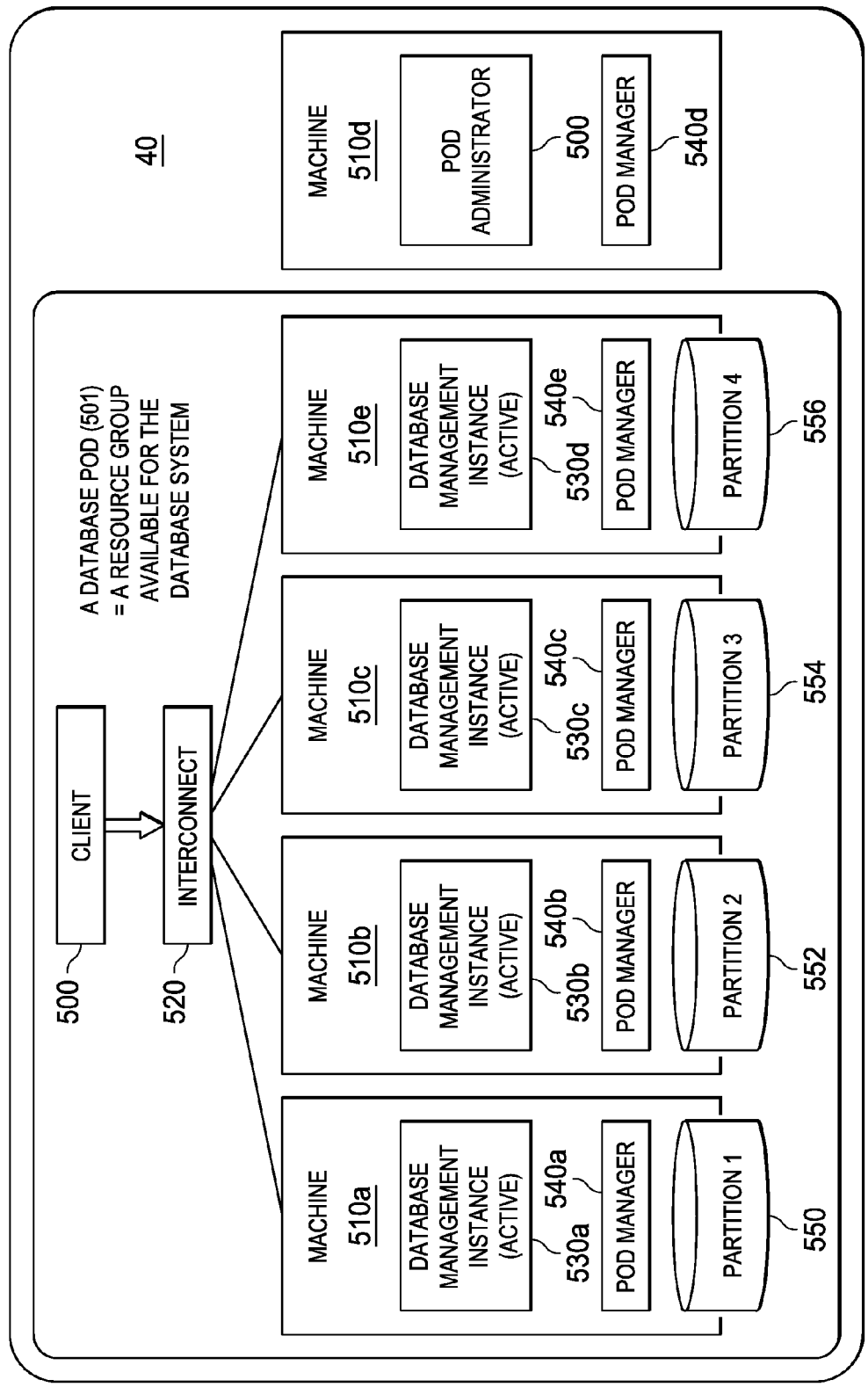
FIG. 5b illustrates the embodiment MPP database system of FIG. 5a when a new machine is added to the pod.

Referring collectively to FIGS. 5a-5b, when a new machine 510e becomes available, the pod 501 is expanded to include that new machine. In that regard, the management instance 530c and the partition 556 from machine 510c in FIG. 5a are relocated to the new machine 510e as shown in FIG. 5b. This process of adding new machines (i.e., resources) to the pod 501 may be repeated as the new machines become available. In other words, the pod 501 has a flexible membership and is expandable or contractible over time. As shown in FIG. 5b, the new machine 510e may be added to the pod 501 even after the management instances 530b, 530c, 530d were launched on the additional machines 510b, 510c in FIG. 5a.

Figure 6:
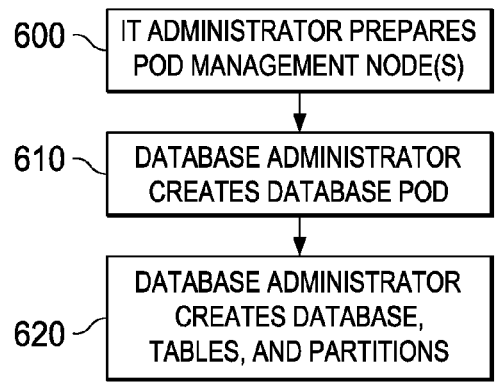
FIG. 6 is a high-level flow diagram illustrating preparation and creation of the database by an information technology (IT) administrator and a database administrator (DBA)

Referring now to FIG. 6, a high-level flow diagram illustrating an embodiment preparation and creation of the database by an information technology (IT) administrator and a database administrator (DBA) is provided. In block 600, the IT administrator prepares for pod management. Thereafter, in block 620, the DBA creates the pods for the database. In block 630, the DBA creates a database, tables, and the partitions.

Figure 7:
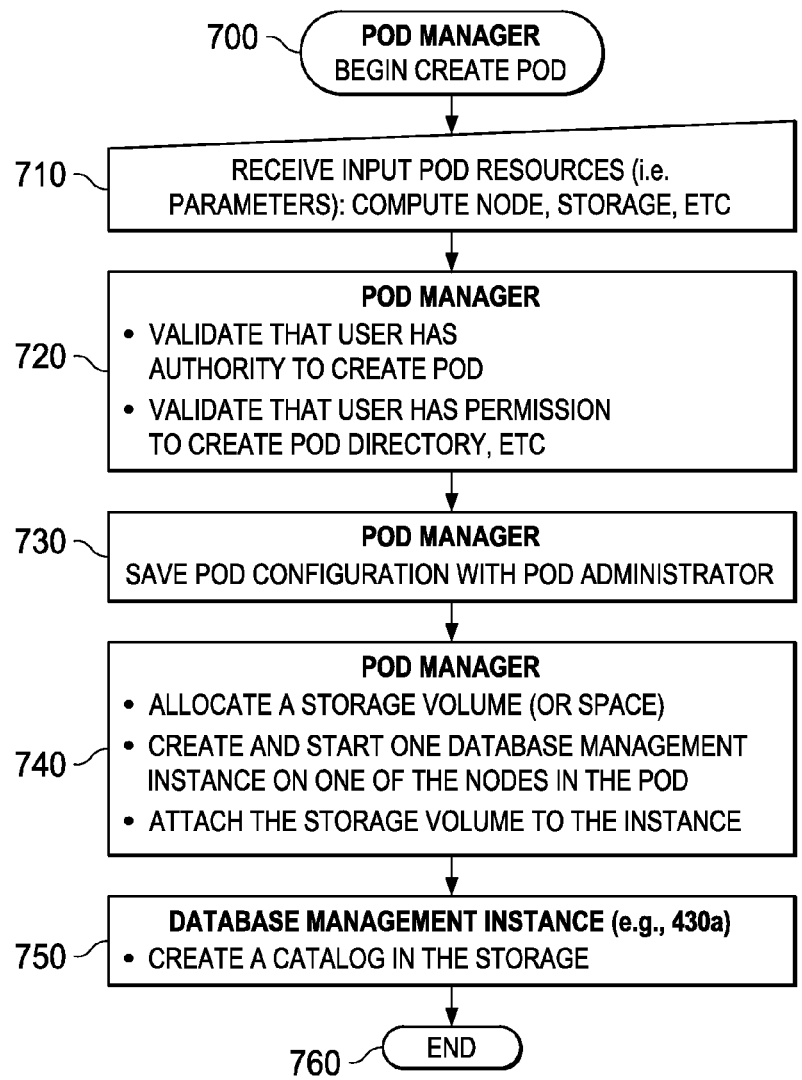
FIG. 7 is a flow diagram illustrating creation of the pod by a pod manager.

Referring now to FIG. 7, a flow diagram illustrating an embodiment creation of the pod 401, 501 by a pod manager is provided. In block 700, the pod manager begins the process of creating the pod. In block 710, an input of pod resources (i.e., parameters) is received. These resources or parameters may include, for example, a compute node, storage, and so on. In block 720, the pod manager validates that the user has authority to create the pod. The pod manager also validates that the user has permission to create the pod directory, and so on. In block 730, the pod manager saves the pod configuration with the pod administrator.

Next, in block 740, the pod manager allocates a storage volume or space. The pod manager also creates and starts one database management instance on one of the nodes (i.e., machines) in the pod. The pod manager further attaches the storage volume to the instance. In block 750, the database management instance (e.g., the database management instance 430 in FIG. 4a) creates a catalog in the storage. Thereafter, in block 760, the process ends.

Figure 8:
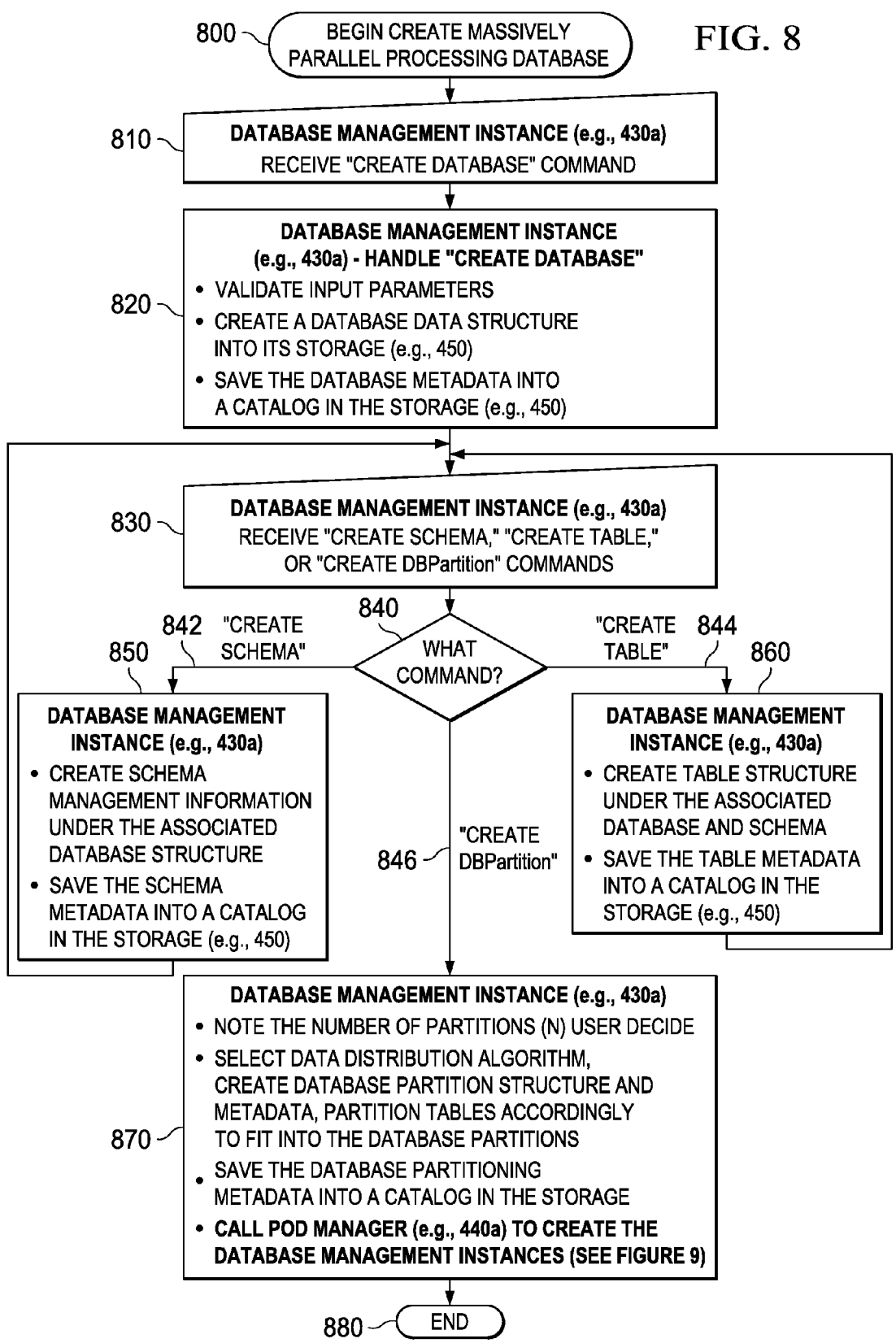
FIG. 8 is a flow diagram illustrating a database (DB) management instance handling the creation of a database and its partition.

Referring now to FIG. 8, a flow diagram illustrating a database (DB) management instance handling the creation of a database and its partition is provided. As shown, in block 800 an embodiment process used to create a massively parallel processing (MPP) database begins. In block 810, a create database command is received by a database management instance (e.g., the database management instance 430 in FIG. 4a). In block 820, the create database management instruction is handled by the database management instance, which validates input parameters, creates a database structure into its storage (e.g., the empty partition 450 in FIG. 4a), and saves the database metadata into a catalog in the storage.

In block 830, the database management instance receives commands such as create schema, create table, or create database partition commands. In block 840, a determination of which command is received is made by the database management instance. If the create schema command 842 was received, then in block 850 the database management instance creates schema management information under the associated database structure and saves the schema metadata into a catalog in the storage (e.g., the partition 450). If the create table command 844 was received, then in block 860 the database management instance creates a table structure under the associated database and schema and saves the table metadata into a catalog in the storage (e.g., the partition 450).

If the create database (DB) partition command 846 was received in block 840, then in block 870 the database management instance notes the number of partitions (N) that the user decided upon, selects a data distribution algorithm, creates a database partition structure and metadata, partitions tables accordingly to fit into the database partitions, and saves the database partitioning metadata into a catalog in the storage. In block 870, the database management instance also calls the pod manager (e.g., pod manager 440a in FIG. 4a) to create the database management instances on the additional machines or resources (e.g., machines 410b, 410c in FIG. 4b, machines 510b, 510c, 510e in FIGS. 5a-5b). Thereafter, in block 880, the process ends.

Figure 9:
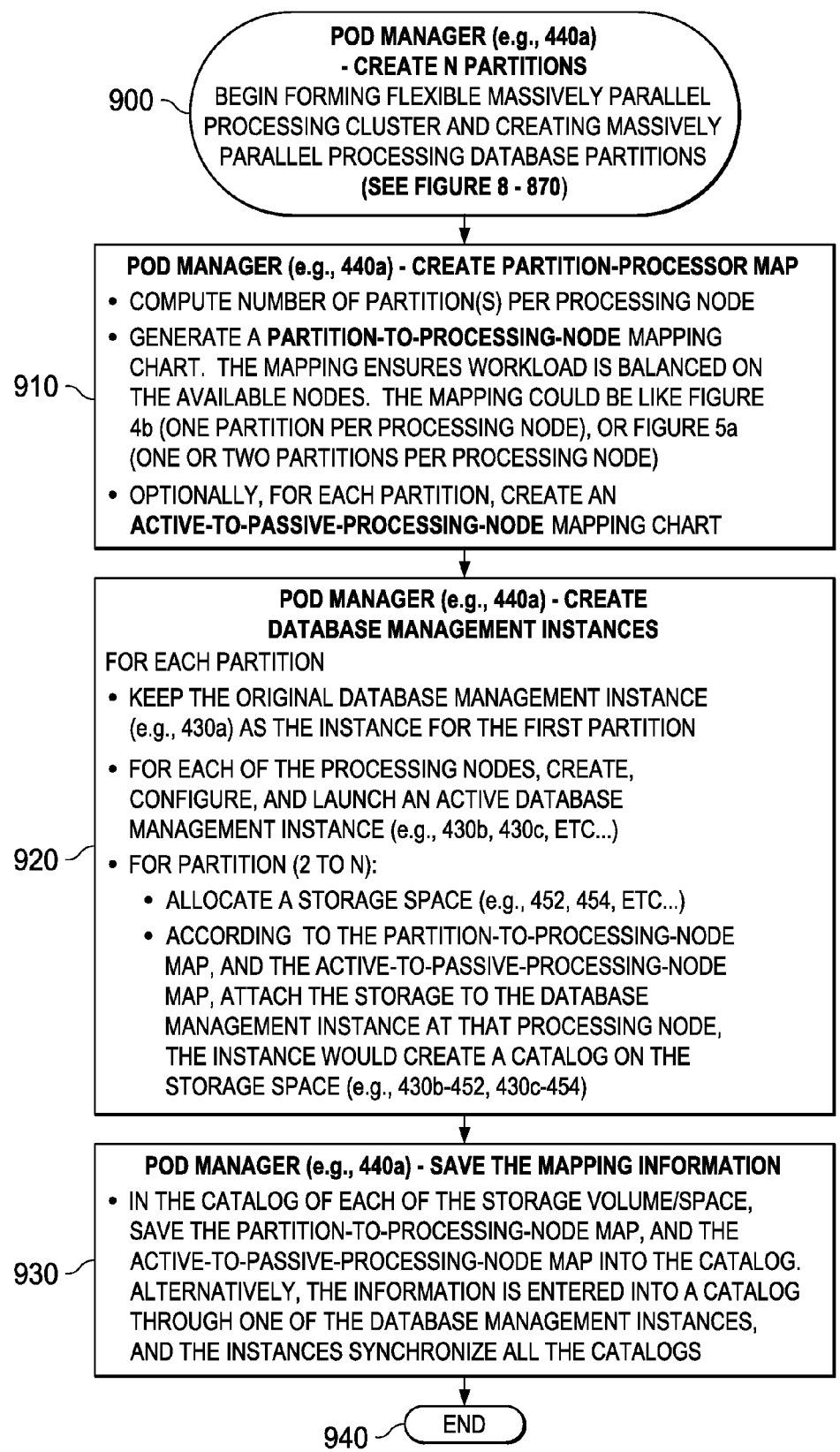
FIG. 9 is a flow diagram illustrating a pod manager forming a flexible pod and creating the database partitions.

Referring now to FIG. 9, a flow diagram illustrating an embodiment of a pod manager forming a flexible pod and creating the database partitions is provided. As shown, in block 900 the pod manager (e.g., pod manager 440a in FIG. 4a) creates a desired number of partitions (N). In doing so, the pod manager begins by forming a flexible pod (i.e., cluster, resource group) and by creating MPP database partitions. In block 910, the pod manager created a partition-processor map by computing a number of partition(s) per processing node and generating a partition-to-processing node mapping chart. The mapping ensures that the workload is balanced on the available nodes. The mapping may have the configuration of FIG. 4b (one partition per processing node) or the configuration of FIG. 5a (one or more partitions per processing node). In an embodiment, an active-to-passive-processing-node mapping chart may be created for each partition.

In block 920, the pod manager creates the database management instances. In doing so, the pod manager keeps the original database management instance (e.g., management instance 430a in FIG. 4a) as the instance for the first partition (Partition 1). Then, the pod manager creates, configures, and launches an active database management instance (instances 430b, 430c, and so on) for each of the processing nodes. Then, for each partition (Partition 2 to Partition N) the pod manager allocates a storage space (partition 452, partition 454, etc.). Next, according to the partition-to-processing-node map and the active-to-passive-processing-node map, the storage is attached to the database management instance at the processing node. The instance. Notably, each instance will create a catalog on the storage space (e.g., 430b-452, 430c-454, etc.).

In block 930, the pod manager saves the mapping information. In doing so, the pod manager saves the partition-to-processing-node map in the catalog of each storage volume/space. The pod manager also saves the active-to-passive-processing-node map into the catalog. In an embodiment, the information is entered into the catalog through one of the database management instances and the instances synchronize all the catalogs. Thereafter, in block 940, the process ends.

Figure 10:
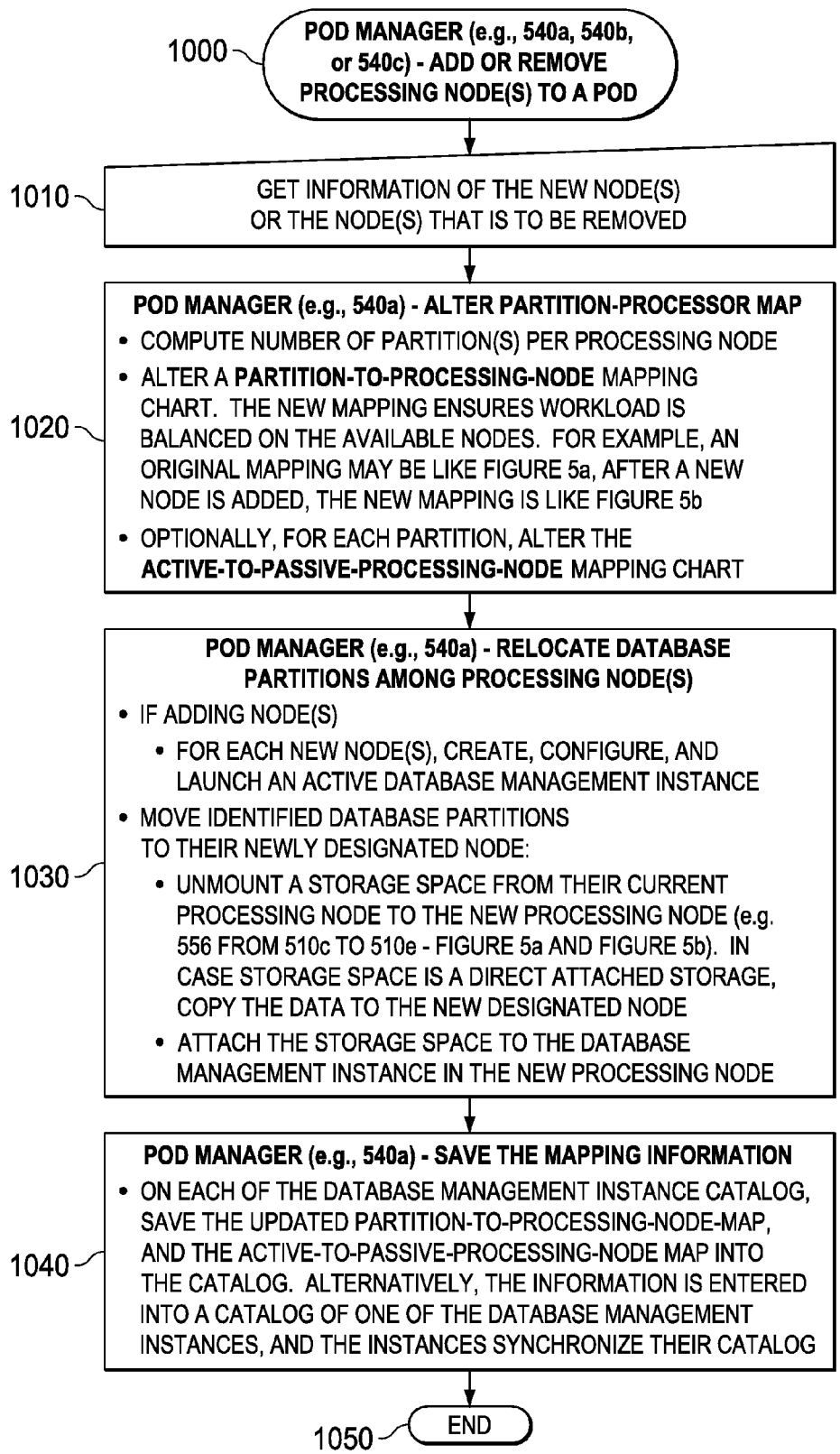
FIG. 10 is a flow diagram illustrating relocation of a database partition when a new machine is added or an existing machine is removed from the pod.

Referring now to FIG. 10, a flow diagram illustrating an embodiment of relocation of a database partition when a new machine is added or an existing machine is removed from the pod is provided. As shown, in block 1000 a pod manager (e.g., pod manager 540a, 540b, 540c in FIGS. 5a-5b) is able to add processing node(s) to the pod and remove processing node(s) from the pod. In block 1010, the pod manager receives information about the new node(s) (i.e., machines, resources) to be added or removed. In block 1020, the pod manager alters the partition-processor map. In doing so, the pod manager computes the number of partition(s) per processing node and alters the partition-to-processing-node mapping chart. The new mapping ensures that the workload is balanced on the available nodes. For example, an original mapping may resemble the configuration in FIG. 5a and a new mapping may resemble the configuration in FIG. 5b. In an embodiment, the active-to-passive-processing-node mapping chart is altered for each partition.

In block 1030, the pod manager relocates database partitions among processing nodes. If adding nodes, then for each node, the pod manager creates, configures, and launches an active database management instance. The pod manager also moves identified database partitions to their newly designated node by un-mounting a storage space from its current processing node to the new processing node (e.g., 556 from 510c to 510e in FIGS. 5a-5b). If the storage space is a direct attached storage, the pod manager copies the data to the new designated node. The pod manager also attaches the storage space to the database management instance in the new processing node.

In block 1040, the pod manager saves the mapping information. In doing so, the pod manager saves the updated partition-to-processing-node map on each of the database management instance catalogs. The database manager also saves the active-to-passive-processing-node map into the catalog. In an embodiment, the information is entered into a catalog of one of the database management instances and the instances synchronize their catalog. Thereafter, in block 1050, the process ends.

Referring now to FIG. 11, a table 50 illustrating table illustrating example pod configurations is provided. As shown, the table 50 includes such information as, for example, a pod name, pod users and securing information, the pod network information, the database management instance access information, a list of processing machines/nodes, a list of storage spaces/volumes and their size, cluster, configuration, and system management and monitoring information. In an embodiment, other information may be included in the table 50. Moreover, some of the information may be removed from the table depicted in FIG. 11.

Referring now to FIG. 12, a table 60 illustrating an example database catalog is provided. As shown, the table 60 includes such information as, for example, the database structure and metadata, the schema/database structure and metadata, the table/schema/database structure and metadata, the database partition structure and metadata, the number of partitions (N), the active partition-to-processing-node map, and the active-to-passive-processing-node map. In an embodiment, other information may be included in the table 60. Moreover, some of the information may be removed from the table depicted in FIG. 12.

The current disclosure changes the emphasis of an MPP database to the data itself rather than focusing on the database management instances. In the current disclosure, an MPP database system is first assigned a pool of resources—machines/processors, storage, and possibly also memory that the MPP database system is allowed to access/use. These resources, the processors, storage, and their communication channels do not have to form a pod/cluster (collaborative group) initially. As a database is created and its partitioning policy is defined, the required computing resources are then grabbed from the allocated pool on-demand and managed as a cluster, the necessary number of database management instances is then launched, and the database partitions (each of the data store) are then physically created on the instances. In the present disclosure, the number of database partitions created does not have to directly correspond to or match the actual number of machines (processors). For example, if there are only 5 machines (processors) available, a database administrator can still create 10 database partitions by permitting two partitions to be served by one machine (one processor). When more machines become available, the partitions can be relocated to the available processor at a later time.

While the disclosure provides illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method for massively parallel processing, comprising:
    initiating a management instance on an initial machine, the management instance generating an initial database partition corresponding to the initial machine;
    determining a total number of database partitions desired for processing a database, the total number of database partitions including the initial database partition;
    determining a number of additional machines available to process the database;
    grouping the initial machine and the additional machines together in a pod;
    generating a database partition-to-processing node mapping chart in accordance with the total number of database partitions and the number of additional machines;
    storing a pod configuration for the pod, wherein the pod configuration comprises a pod name; and
    after initiating the management instance on the initial machine, launching the management instance on the additional machines in the pod to generate the total number of database partitions desired for the database, without reinitiating the management instance on the initial machine and without regenerating the initial database partition.

2. The method of claim 1, wherein the pod has a flexible membership over time.

3. The method of claim 1, wherein the pod is expandable over time to add new machines as the new machines become available to process the database.

4. The method of claim 1, further comprising expanding the pod to include a new machine after the management instance has been launched on the additional machines.

5. The method of claim 1, wherein the steps of determining the number of additional machines and grouping the initial machine and the additional machines together are repeated.

6. The method of claim 1, wherein the total number of the database partitions is greater than a sum total number of the initial machines and the additional machines.

7. The method of claim 1, wherein one of the additional machines is running at least two of the management instances.

8. The method of claim 7, further comprising relocating one of the management instances from the additional machine running two of the management instances to a new machine.

9. The method of claim 8, wherein the new machine was added to the pod when the new machine became available to process the database.

10. The method of claim 1, wherein one of the additional machines is running at least two of the management instances, each of the management instances corresponding directly with one of the database partitions.

11. A method for massively parallel processing, comprising:
    initiating a management instance on an initial machine, the management instance generating an initial database partition corresponding to the initial machine;
    determining a total number of database partitions desired for processing a database, the total number of database partitions including the initial database partition;
    determining a number of additional machines available to process the database, a sum total of the additional machines and the initial machine less than the total number of database partitions desired;
    grouping the initial machine and the additional machines together in a pod;
    generating a database partition-to-processing node mapping chart in accordance with the total number of database partitions and the number of additional machines;
    storing a pod configuration for the pod, wherein the pod configuration comprises a pod name; and
    after initiating the management instance on the initial machine, launching the management instance on the additional machines in the pod to generate the total number of database partitions desired for the database, without reinitiating the management instance on the initial machine and without regenerating the initial database partition.

12. The method of claim 11, wherein the pod has a flexible membership over time.

13. The method of claim 11, wherein the pod is expandable over time to add new machines as the new machines become available to process the database.

14. The method of claim 11, further comprising expanding the pod to include a new machine after the management instance has been launched on the additional machines.

15. The method of claim 11, wherein the steps of determining the number of additional machines and grouping the initial machine and the additional machines together are periodically repeated.

16. The method of claim 11, wherein one of the additional machines is running at least two of the management instances.

17. The method of claim 16, further comprising relocating one of the management instances from the additional machine running two of the management instances to a new machine.

18. The method of claim 17, wherein the new machine was added to the pod when the new machine became available to process the database.

19. A massively parallel processing system, comprising:
    an initial machine in a pod, the initial machine running a management instance initiated on the initial machine generating an initial database partition for processing a database;
    an additional machine added to the pod after the management instance is initiated on the initial machine, without reinitiating the management instance on the initial machine and without regenerating the initial database partition, the additional machine running two of the management instances for processing the database, each of the management instances corresponding to an additional database partition; and
    a pod administrator machine configured to store a pod configuration, wherein the pod configuration comprises a pod name.

20. The massively parallel processing system of claim 19, wherein the pod has a flexible membership permitting a new machine for processing the database to be added.

21. The massively parallel processing system of claim 20, wherein the additional machine running two of the management instances is configured to relocate one of the management instances to the new machine.

* * * * *